(12) United States Patent
Waugh

(10) Patent No.: US 12,373,164 B2
(45) Date of Patent: Jul. 29, 2025

(54) ASYNCHRONOUS DATA TRANSFER

(71) Applicant: Arm Limited, Cambridge (GB)

(72) Inventor: Alex James Waugh, Cambridge (GB)

(73) Assignee: Arm Limited, Cambridge (GB)

( * ) Notice: Subject to any disclaimer, the term of this patent is extended or adjusted under 35 U.S.C. 154(b) by 56 days.

(21) Appl. No.: 18/529,237

(22) Filed: Dec. 5, 2023

(65) Prior Publication Data

US 2025/0181314 A1   Jun. 5, 2025

(51) Int. Cl.
*G06F 5/06* (2006.01)
*G06F 1/12* (2006.01)

(52) U.S. Cl.
CPC . *G06F 5/06* (2013.01); *G06F 1/12* (2013.01)

(58) Field of Classification Search
CPC ..................................... G06F 5/06; G06F 1/12
See application file for complete search history.

(56) References Cited

U.S. PATENT DOCUMENTS

| | | | | |
|---|---|---|---|---|
| 8,708,229 B1 * | 4/2014 | Huth | ...................... | G06Q 40/02 235/379 |
| 9,798,352 B1 * | 10/2017 | Majumdar | ................. | G06F 1/10 |
| 10,452,345 B1 * | 10/2019 | Coburn, IV | ....... | H04N 21/4307 |
| 2011/0202788 A1 * | 8/2011 | Hesse | ................... | G06F 1/3287 713/600 |
| 2012/0194487 A1 * | 8/2012 | Roethig | ................ | G06F 3/1438 345/3.1 |
| 2022/0279149 A1 * | 9/2022 | Ma | .......................... | G09G 5/12 |
| 2023/0072459 A1 * | 3/2023 | Meil | ........................ | G06F 1/26 |

OTHER PUBLICATIONS

U.S. Appl. No. 18/077,289, filed Dec. 8, 2022, Julian Katenbrink.

* cited by examiner

*Primary Examiner* — Henry Tsai
*Assistant Examiner* — Aurangzeb Hassan
(74) *Attorney, Agent, or Firm* — NIXON & VANDERHYE P.C.

(57) ABSTRACT

An apparatus is provided with asynchronous boundary transfer circuitry to transfer data across a clock domain boundary. The asynchronous boundary transfer circuitry has buffer circuitry with buffer storage elements, and source and sink synchronisation circuitry to control the transfer of the data. To initiate a transfer of data items, the source synchronisation circuitry sends a transfer request to the sink synchronisation circuitry indicating that the data items have been stored in one or more buffer storage elements and encoding an indication of one or more elements of destination circuitry targeted by the data items. The sink synchronisation circuitry is responsive to a transfer request to decode an indication of the elements of destination circuitry targeted by the data items, provide incoming data item notifications to elements of destination circuitry, and allow the data items to be read from buffer storage elements indicated by the given transfer request.

17 Claims, 13 Drawing Sheets

ASYNCHRONOUS DATA TRANSFER

BACKGROUND

The present technique relates to the field of data processing. More particularly, the invention relates to asynchronous data transfer.

Where different domains of a processing apparatus operate in response to different clock signals having potentially different clock frequencies, a clock boundary will occur between these clock domains. To transfer data between clock domains, asynchronous boundary transfer circuitry may be used which is able to provide a form of synchronisation between the asynchronously operating domains and enable the reliable transfer of data across the clock domain boundary.

SUMMARY

In one example arrangement, there is provided an apparatus comprising: asynchronous boundary transfer circuitry to transfer data from a source domain to a sink domain across a clock domain boundary, the asynchronous boundary transfer circuitry comprising: buffer circuitry comprising one or more buffer storage elements to store data items for transfer across the clock domain boundary; source synchronisation circuitry to control writing into the one or more buffer storage elements from the source domain; and sink synchronisation circuitry to control reading out from the one or more buffer storage elements in the sink domain; wherein to initiate a transfer of one or more particular data items from the source domain to the sink domain, the source synchronisation circuitry is configured to send a transfer request to the sink synchronisation circuitry indicating that the one or more particular data items have been stored in one or more particular buffer storage elements of the one or more buffer storage elements, the transfer request additionally encoding an indication of one or more respective elements of destination circuitry targeted by the one or more particular data items; wherein the sink synchronisation circuitry is responsive to a given transfer request to: decode, from the given transfer request, an indication of one or more given elements of destination circuitry targeted by one or more given data items associated with the given transfer request, provide one or more incoming data item notifications to the one or more given elements of destination circuitry, and allow the one or more given data items to be read from one or more given buffer storage elements indicated by the given transfer request.

In another example arrangement, there is provided a system comprising: the apparatus as described herein, implemented in at least one packaged chip; at least one system component; and a board, wherein the at least one packaged chip and the at least one system component are assembled on the board.

In a further example arrangement, there is provided a chip-containing product comprising the system as described above, assembled on a further board with at least one other product component.

In a yet further example arrangement, there is provided a non-transitory computer-readable medium to store computer-readable code for fabrication of an apparatus comprising: asynchronous boundary transfer circuitry to transfer data from a source domain to a sink domain across a clock domain boundary, the asynchronous boundary transfer circuitry comprising: buffer circuitry comprising one or more buffer storage elements to store data items for transfer across the clock domain boundary; source synchronisation circuitry to control writing into the one or more buffer storage elements from the source domain; and sink synchronisation circuitry to control reading out from the one or more buffer storage elements in the sink domain; wherein to initiate a transfer of one or more particular data items from the source domain to the sink domain, the source synchronisation circuitry is configured to send a transfer request to the sink synchronisation circuitry indicating that the one or more particular data items have been stored in one or more particular buffer storage elements of the one or more buffer storage elements, the transfer request additionally encoding an indication of one or more respective elements of destination circuitry targeted by the one or more particular data items; wherein the sink synchronisation circuitry is responsive to a given transfer request to: decode, from the given transfer request, an indication of one or more given elements of destination circuitry targeted by one or more given data items associated with the given transfer request, provide one or more incoming data item notifications to the one or more given elements of destination circuitry, and allow the one or more given data items to be read from one or more given buffer storage elements indicated by the given transfer request.

In a further example implementation, there is provided a method of transferring data from a source domain to a sink domain across a clock domain boundary, the method comprising: storing data items for transfer across the clock domain boundary; to initiate a transfer of one or more particular data items from the source domain to the sink domain, sending a transfer request to the sink synchronisation circuitry indicating that the one or more particular data items have been stored in one or more particular buffer storage elements of the one or more buffer storage elements, the transfer request additionally encoding an indication of one or more respective elements of destination circuitry targeted by the one or more particular data items; responsive to a given transfer request: decoding, from the given transfer request, an indication of one or more given elements of destination circuitry targeted by one or more given data items associated with the given transfer request, providing one or more incoming data item notifications to the one or more given elements of destination circuitry, and allowing the one or move given data items to be read from one or more given buffer storage elements indicated by the given transfer request.

BRIEF DESCRIPTION OF THE DRAWINGS

Further aspects, features, and advantages of the present technique will be apparent from the following description of examples, which is to be read in conjunction with the accompanying drawings.

DESCRIPTION OF EXAMPLES

Figure 1:
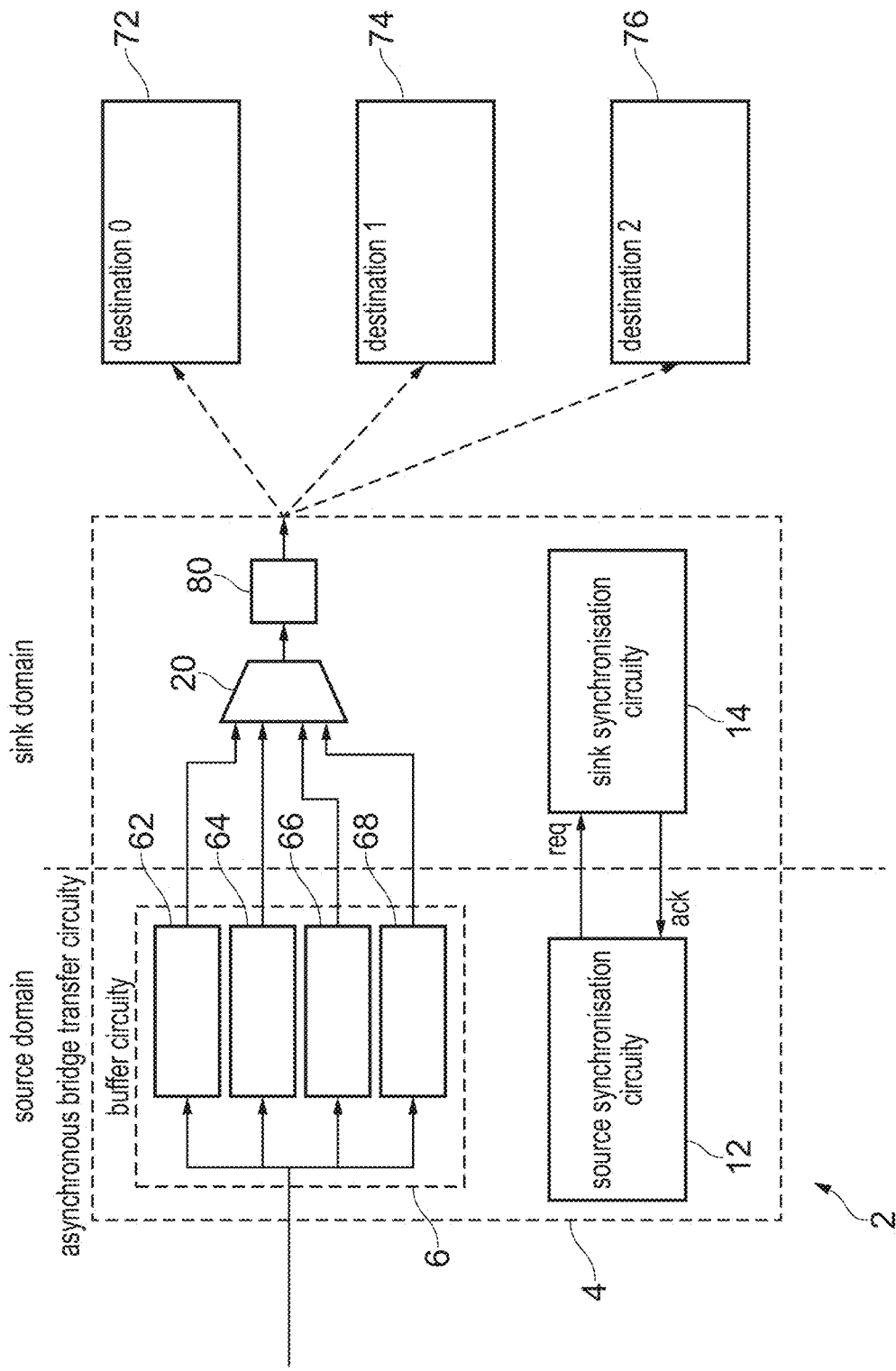
FIG. 1 is a schematic illustration of an apparatus in which the techniques described herein may be implemented.

Before discussing the examples with reference to the accompanying figures, the following description of examples is provided.

Within some processing devices, a pend signal or notification signal may be used to indicate if there will be (or if there is likely to be) a data item or transaction sent in the following clock cycle of the processing device. This pend signal can be used to improve the power efficiency of the processing device by facilitating more efficient clock gating of components that are not needed to be active at a given time. Specifically, the pend signal may be used as a warning to clock-gated components (i.e., components for which a clock signal has been temporarily suspended, for example to reduce the power consumption of the component) to cease the clock-gating and 'wake-up' the component when it expected to receive a data item in a subsequent clock cycle. By providing the pend signal, the processing device may be able to more aggressively make use of clock-gating without imposing an unacceptable performance impact since the clock-gated components can be awoken before a data item destined for those components is received.

However, even where such a pend signal is implemented, the power efficiency improvements may be limited if the processing device has multiple possible destinations that could receive the data item. If the pend signal does not indicate which of the destinations is targeted by the data item, the processing device may need to wake-up multiple potential destinations that could be targeted by the data item, limiting the potential power efficiency savings achieved by clock-gating the components that were not targeted by the data item.

Accordingly, a pend signal that is able to encode some information about the destination that will likely be targeted by the upcoming data item can help with power saving within the device. With such a pend signal, the processing device is able to wake-up only the component or components representing the destination of the data item.

It should be appreciated that even before the pend signal or notification is received, the destination of the data item may already be in an active or operating state (i.e., not clock-gated). However, by notifying the destination in advance of an impending data item, the processing device may be more likely to be able to apply clock-gating to the destination component and to wake-up that destination component without waking up other components that are not the destination of a given data item.

Where a data item crosses an asynchronous boundary (also referred to as a clock boundary), it can be difficult to provide a notification of the data item that is received at least one clock cycle ahead of the data item in the destination domain (the sink domain). Since the circuitry in the source domain and sink domain operate asynchronously, signals sent on subsequent cycles in the source domain will not necessarily align with subsequent cycles in the sink domain. Consequently, merely sending a pend signal across the asynchronous boundary a cycle in the source domain ahead of the data to which it relates may not be sufficient to ensure the notification of the destination circuitry in the sink domain in advance of the data being ready in the sink domain.

To enable data transfer between clock domains, an asynchronous crossing (also referred to as asynchronous boundary transfer circuitry) may be provided which controls the provision of data into a buffer in the source domain and the reading of that data in the sink domain. The asynchronous crossing may make use of a synchronisation signal to allow circuitry in the source domain and sink domain to communicate their respective states to each other (e.g., to indicate when the source domain has stored data into buffers of the asynchronous crossing and when the sink domain has read that data). According to some techniques, this synchronisation signal may be used to provide an advance indication that data will be received in the sink domain in the next cycle. Based on detecting a change in the synchronisation signal from the source domain, the synchronisation circuitry in the sink domain may determine that data has been stored in one or more buffers by the source domain to be read into the sink domain. At this point therefore, the sink synchronisation circuitry could notify circuitry in the sink domain that data is expected in a subsequent cycle. This may allow the circuitry in the sink domain to transition to an operating state, for example by ceasing clock-gating. Thus, this approach could be used to form a pend signal in the sink domain to notify the sink domain of impending data items, without knowing the actual payload.

However, there may be multiple possible destinations within the sink domain that could be targeted by data items from the source domain. With the above-described approach, it may not be possible to distinguish, using the synchronisation signal, which of the possible destinations are to be targeted by the impending data item. Consequently, the sink domain may need to wake-up all possible destinations in the sink domain. This need to wake-up multiple destinations, many of which may not be targeted by the relevant data item, can limit the power-savings achievable using clock-gating.

In accordance with the techniques described herein, there is therefore provided an approach by which a notification of an upcoming data item that is to be provided on a subsequent cycle can be transmitted across an asynchronous boundary and which can identify which of a plurality of supported destinations are to be targeted by the data item. Thus, power control circuitry in the sink domain can apply clock-gating or other power-saving techniques to the destination elements in the sink domain such that when this notification of the data item is then received, only the destination or destinations targeted by the data item then need to be restored to their operating state to handle the data item. This enables the other destinations to remain in a power-saving state (if already in such a state).

To provide this targeted notification, the asynchronous boundary transfer circuitry is configured to make use of a transfer request between the source domain and the sink domain that not only indicates that one or more data items are to be transferred but also encodes an indication of the one or more destinations targeted by the respective data items. Thus, circuitry in the sink domain is able to provide incoming data item notifications to the relevant destinations in advance of the data items being made available to those destinations.

It should be understood that transfer request signals are individually synchronised in the destination clock domain. This means that if more than one bit in a given message between domains changes at a time, it is not possible to determine the order that the destination will see each bit changing, and the destination will not know when it has received all the changes because it does not know in advance how many bits would be changing. Thus, providing a destination indication in parallel to the transfer request (as may be performed for synchronous communications within a clock domain) may not be possible when communicating between domains. In accordance with the techniques described herein, there is therefore provided an apparatus with asynchronous boundary transfer circuitry to handle the transfer of data across a clock domain boundary. The asynchronous boundary transfer circuitry has buffer circuitry (which may be first-in, first-out (FIFO) buffer circuitry) comprising one or more buffer storage elements to store the data items for transfer across the clock domain boundary. Data items to be transferred are written into the buffer storage elements under the control of source synchronisation circuitry in the source domain. They can then be read out in the sink domain under the control of sink synchronisation circuitry. The source synchronisation circuitry and the sink synchronisation circuitry coordinate their operations by exchanging transfer requests.

To initiate a transfer of a data item (or multiple data items) from the source domain to the sink domain, the source synchronisation circuitry sends a transfer request to the sink synchronisation circuitry to indicate that the data item (or data items) have been stored in the buffer storage elements of the asynchronous boundary transfer circuitry. This transfer request identifies the buffer storage element(s) that have been populated. Additionally, the transfer request encodes an indication of the elements of the destination circuitry targeted by the data items.

The sink synchronisation circuitry then receives this transfer request, at which point it can decode the indication identifying the elements of destination circuitry targeted by data items and provide an incoming data notification to them, thereby providing an advance notification of the data items at least a cycle ahead of the data items becoming available. Having provided this notification, the sink synchronisation circuitry then allows the data item(s) to be read from the respective buffer storage element(s).

In some examples, the asynchronous bridge transfer circuitry may be configured to transfer a maximum of one data item per clock cycle. In such cases, the transfer request will encode the element of destination circuitry targeted by the data item. However, in some examples, the asynchronous bridge transfer circuitry may be operable to transfer multiple data items in a single clock cycle. In such cases, the transfer request may identify the destination circuitry separately for each data item or may identify all of the destinations targeted by the data items without identifying specifically which destination corresponds to which data item.

The transfer request could take a number of possible forms; however, in some examples the transfer request comprises respective portions corresponding to each of the buffer storage elements in the asynchronous bridge transfer circuitry. Thus, the source sink circuitry may be responsive to a data item being stored into a particular buffer storage element to set the relevant portion of the transfer request to indicate the availability of that data item.

Each portion of the transfer request may comprise a plurality of elements that each correspond to a destination in the sink domain. Accordingly, to encode both the buffer storage element in which a data item is stored and the destination targeted by the data item, the source synchronisation circuitry can update the relevant element (based on the destination) of the relevant portion (based on the buffer storage element) of the transfer request. The sink synchronisation circuitry can then decode this information in the sink domain, enabling the sink synchronisation circuitry to notify the destination of the incoming data item at least a cycle in the sink domain ahead of the data item being available from the asynchronous bridge transfer circuitry.

Since the transfer request forms the indication to the sink synchronisation circuitry that there is a data item available in the buffer storage that can be transferred into the sink domain, the transfer request will be received in advance of the data item becoming available in the sink domain. The sink synchronisation circuitry will then take at least one clock cycle in the sink domain before that data item is made available to the destination circuitry for which the data item is destined.

The destination circuitry may be responsive to such an incoming data item notification while operating in a power saving state to transition the destination circuitry to an operating state. Thus, based on the notification, processing circuitry operating as the destination circuitry can return itself to a state in which it can handle the data item.

In some examples, the processing circuitry that implements the destination circuitry has clock control circuitry that is able to provide control over the clock signals provided within the processing circuitry including the ability to gate the clock signal when the processing circuitry is in the power saving state. Thus, to return the processing circuitry to the operating state, the clock control circuitry may be responsive to the incoming data notification to cease gating the clock signal for the processing circuitry.

The transfer request as described herein may be signalled within the apparatus based on changing elements of a transfer request signal. That is, rather than the value of the transfer request signal itself being directly indicative of the transfer request (and consequently the buffer storage element and destination associated with a data item), synchronisation circuitry may signal changes in state based on changes to a previous version of the transfer request signal. Thus, a change in a particular element of the transfer request signal rather than the value of the transfer request signal itself may be used to represent the transfer request.

This approach may simplify the requesting and acknowledgement process between the source synchronisation circuitry and the sink synchronisation circuitry. Due to the clock domain boundary, the source synchronisation circuitry may need to wait for an acknowledgement of the transfer request from the sink synchronisation circuitry before it can cease asserting the transfer request. If the value of the transfer request signal itself were used to indicate the transfer request, a four-phase handshake process may need to be implemented to carry out the request/acknowledgement process. Specifically, the source synchronisation circuitry would assert the request, then the sink synchronisation circuitry would acknowledge that request. Only once the source synchronisation circuitry had seen that acknowledgement can the source synchronisation circuitry return the transfer request signal to its unasserted value, at which point the sink synchronisation circuitry could deassert the acknowledgement, returning the transfer request signal and acknowledgement signal to their initial states ready to be used again. However, where the transfer request is signalled using changes in the transfer request signal, the source synchronisation circuitry can indicate the transfer request by changing the relevant element of the transfer request signal with the acknowledgement signalled by the sink synchronisation circuitry based on updating a corresponding element of an acknowledgement signal. There would then be no need to return the transfer request signal to the deasserted state, allowing a two-phase handshake to be implemented and providing a more efficient manner of signalling between the clock domains.

The acknowledgement signal could take a number of possible forms. For example the acknowledgement signal may comprise a single bit that is sent to indicate that the given transfer request has been received or may involve sending, as the acknowledgement signal, the transfer request signal received from the source synchronisation circuitry back to the source synchronisation circuitry. With this example, the sink synchronisation circuitry would confirm both the buffer storage elements for which the transfer request signal had been received but also the destination information sent with the transfer request. In yet further examples, the acknowledgement signal may comprise an element for each of the buffer storage elements, with the respective element or elements of the acknowledgement signal set to indicate the buffer storage element(s) for which the given transfer request has been accepted. With this example, the acknowledgement signal would not specifically identify the destination that had been indicated by the transfer request signal but would reflect the buffer storage element in question.

The present techniques will now be described with reference to the figures.

FIG. 1 is a schematic illustration of an apparatus 2 in which the techniques described herein may be implemented. The apparatus 2 has components operating in two separate clock domains: a source domain and a sink domain. The components in each domain are clocked and operate in response to respective clock signals used to synchronise the components in the respective domains. The components in the source domain operate in response to a source clock signal and the components in the sink domain operate in response to a sink clock signal. The source and sink domain clock signals are not synchronised with each other and so the components in the respective domains can be said to operate asynchronously. This asynchronous operation can complicate the process of transferring data between the domains. Unlike synchronously operating components for which data can be transferred by connecting components in series, when components in the source domain make data available to components in the sink domain, it is not known when that data has been read in the sink domain such that it is safe to update that data on the source side.

To provide a mechanism to safely transfer data from the source domain to the sink domain, asynchronous bridge transfer circuitry 4 is provided. The asynchronous bridge transfer circuitry 4 has buffer circuitry 6 to temporarily store data items to be transferred and synchronisation circuitry 12, 14 in each of the source domain and the sink domain to synchronise the operations of the asynchronous bridge transfer circuitry 4 in the respective domains.

The buffer circuitry 6 comprises data storage elements 62-68 (which may be registers) in the source domain into which data items to be transferred to the sink domain can be transferred. A multiplexer 20 is then provided which operates under the control of the sink synchronisation circuitry 14 to selectively allow the transfer of data items from a selected buffer storage element into a sink storage element 80 from which the data item can be accessed by elements of destination circuitry 72-76. It should be appreciated that the arrangement of buffer storage elements 62-68 and the sink storage element 80 represents one example arrangement and other arrangements could also be used. For example, more or fewer buffer storage elements may be provided (indeed, generally there may be one or more buffer storage elements) and/or more sink storage elements may be provided.

To control the operation of the buffer storage elements 62-68 each buffer storage element may be clock-gated by an enable signal issued by the source synchronisation circuitry 12. The enable signal is used to control when data can be read into the buffer storage elements such that when the enable signal is set, the data storage element will, on a next clock cycle of the relevant domain, read in any data that is provided at the input of the buffer storage element.

The source synchronisation circuitry 12 and the sink synchronisation circuitry 14 operate to control when data items are read into each of the buffer storage elements 62-68 and synchronise this transfer of data so that, despite the clocks in the source domain and the sink domain operating asynchronously and with potentially different clock frequencies, data can nonetheless be safely transferred between the domains. To coordinate the operation of the asynchronous bridge transfer circuitry 4, the source synchronisation circuitry 12 and the sink synchronisation circuitry 14 exchange signals in the form of requests and acknowledgements. For example, a request from the source synchronisation circuitry 12 may indicate that one or more data items have been stored into buffer storage elements of the buffer circuitry 6. The sink synchronisation circuitry 14 may then acknowledge this request with an acknowledgement signal to indicate that the data items have been transferred into the sink domain via the sink storage element 80 such that it is safe for the source synchronisation circuitry 12 to allow further data items to overwrite the contents of those buffer storage elements.

In the sink domain, there are several elements of processing circuitry which represent different possible destinations 72-76 for the data items crossing the asynchronous boundary.

In accordance with the techniques described herein, the source synchronisation circuitry 12 is configured to encode in the transfer request an indication of the destination circuitry targeted by data items that are to be transferred across the clock domain boundary. For example, if a data item was stored into buffer storage element 64 and was destined for destination 2 76, the source synchronisation circuitry 12 would send a transfer request to the sink synchronisation circuitry 14 identifying both that buffer storage element 64 had been populated and that the data item to be transferred was destined for destination 2.

The sink synchronisation circuitry 14 responds to the transfer request by controlling the multiplexer 20 and sink storage element 80 to read in the data item referred to by the transfer request at least one cycle after the transfer request has been received and the upcoming data item notification sent to the relevant element of destination circuitry. Thus, the destination circuitry can receive this notification and may respond by transitioning out of a low-power state to be ready to handle the incoming data item before the data item is actually available.

Figure 2:
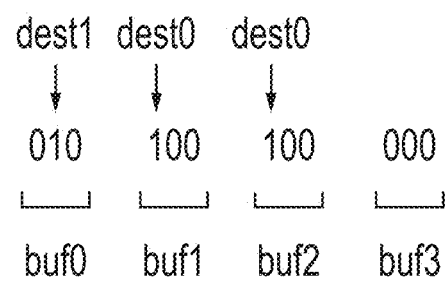
FIG. 2 illustrates an example form of transfer request able to encode an indication of an element of destination circuitry.

FIG. 2 illustrates an example form of transfer request able to encode an indication of an element of destination circuitry. In this example, the transfer request comprises four portions, each portion having three elements (where each element is one bit). Each of the four portions corresponds to a buffer storage element such that, to signal a change in the status of one of the buffer storage elements, the respective portion of the transfer request can be updated.

Each portion of the transfer request has three elements (or bits) where each bit of a respective portion corresponds to an element of destination circuitry. Thus, to signal a data item having been stored in buffer storage element 0 that is destined for destination element 1, the bit corresponding destination 1 within the portion corresponding to buffer storage element 0 may be updated. In this example, the bits corresponding to destination 1 for buffer storage element 0, destination 0 for buffer storage element 1, and destination 0 for buffer storage element 2 have been set.

In some examples, the transfer request may be signalled using a transfer request signal having the value of the transfer request; however, in some examples the synchronisation circuitry may be responsive to changes in a transfer request signal such that it is the bits of the transfer request signal that are altered compared to a previous version of the transfer request signal that are used to indicate the transfer request. This latter approach can provide a more efficient way of communicating between the source synchronisation circuitry and the sink synchronisation circuitry by reducing the number of signals that need to be exchanged to successfully send a request, acknowledge the request and become ready to send a new data item.

FIGS. 3A-3F depict a worked example of transferring data items within an example apparatus 2. The apparatus 2 in these figures and in FIGS. 4A-4B corresponds to the apparatus 2 described with reference to FIG. 1 and so a full description of the components of this apparatus 2 will not be repeated.

Figure 3A:
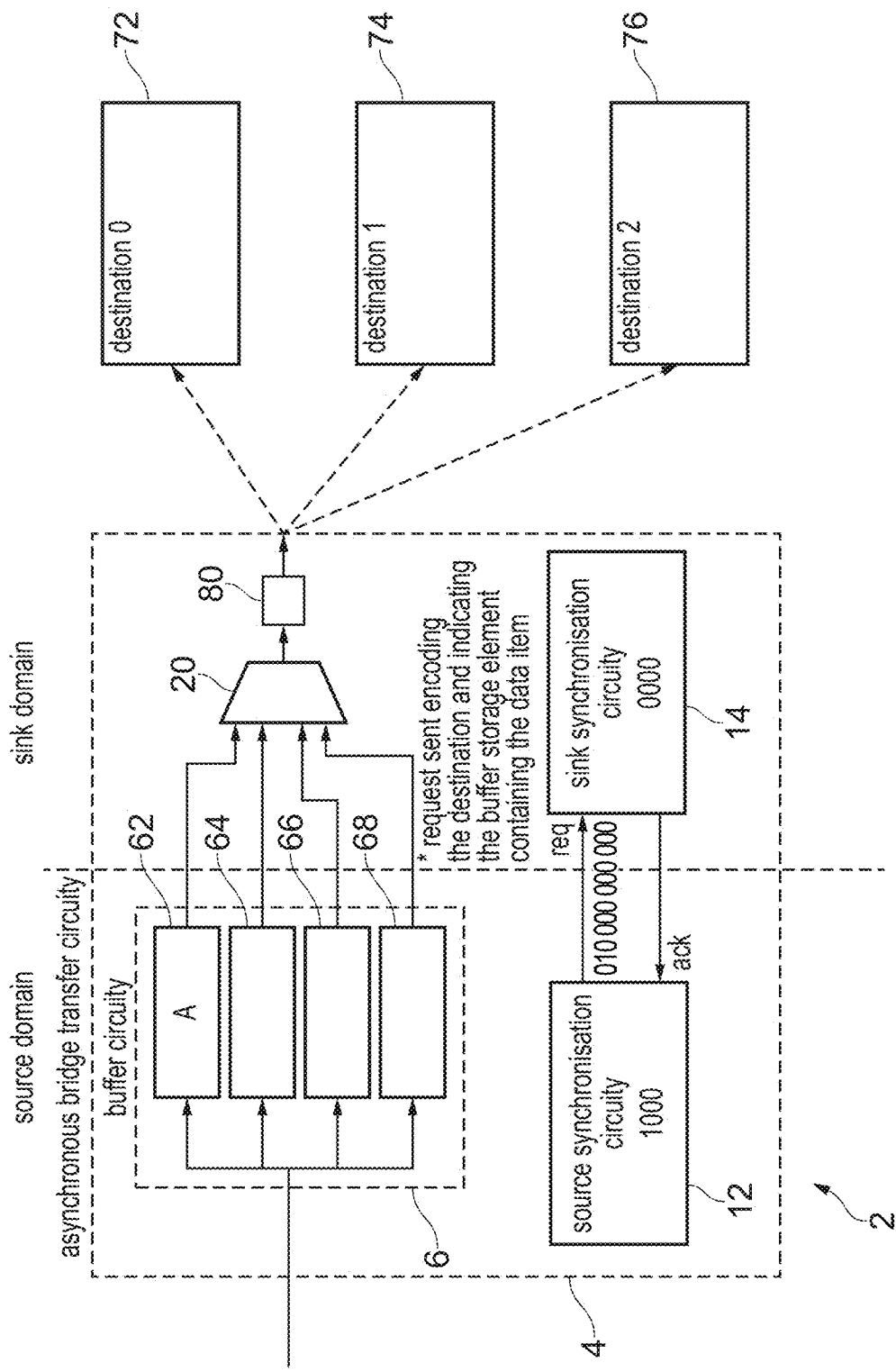
FIGS. 3A-3F depict a worked example of transferring data items within an example apparatus.

As shown in FIG. 3A, a data item A has been stored in buffer storage element 62 by circuitry in the source domain for transfer into the sink domain. The source synchronisation circuitry 12 maintains a status indication having four bits to represent the status of each of the four buffer storage elements 62-68. At this point, the status has the value 1000 to indicate that a data item has been stored in buffer storage element 62. The source synchronisation circuitry 12 also sends a transfer request to the sink synchronisation circuitry 14 to notify the sink synchronisation circuitry 14 that a data item has been placed in buffer storage element 62 ready to be read into the sink domain.

The transfer request signal, indicative of the transfer request, has the form described above with reference to FIG. 2, and has a value of 010,000,000,000 to indicate that the data item has been stored in buffer storage element 62 and that the destination of the data item (as may be determined, for example, based on a header of the data item) is destination 1 74.

The sink synchronisation circuitry 14 also maintains a status which at this point is 0000 to reflect that the sink synchronisation circuitry 14 is not aware of any of the buffer storage elements 62-68 being populated with data to be transferred into the sink domain.

Figure 3B:
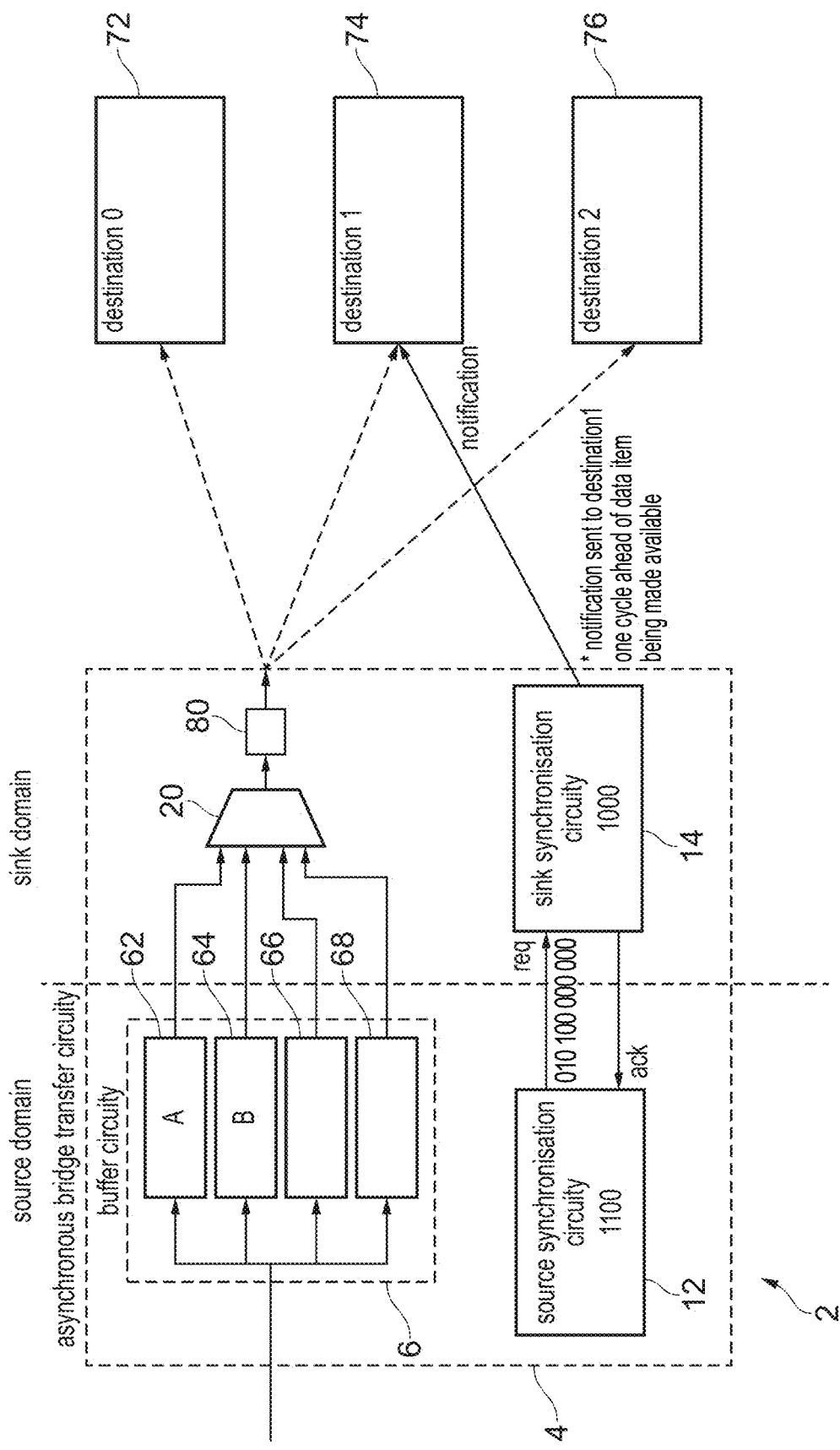

FIG. 3B illustrates a subsequent cycle within the context of the same worked example. At this point, another data item, data item B has been stored in the buffer circuitry 6 and the status maintained by the source synchronisation circuitry 12 has been updated to reflect the presence of this data item.

The source synchronisation circuitry 12 consequently updates the transfer request signal visible to the sink synchronisation circuitry 14 to 010,100,000,000 to indicate that a data item that targets destination 0 has been stored in buffer storage element 64.

In the meantime, the sink synchronisation circuitry 14 has observed the transfer request depicted in FIG. 3A and has updated its own status to 1000 to indicate that a data item is stored in buffer storage element 62. The sink synchronisation circuitry 14 has also decoded the transfer request from the source synchronisation circuitry 12 to determine that the data item that has been placed in buffer storage element 62 will target destination 1 74. Consequently, the sink synchronisation circuitry 14 is able to send an upcoming data item notification to destination 1 74 ahead of the data item A actually becoming available to destination 1 74. Destination 1 74 can therefore take actions to prepare for the incoming data item. These actions may include transitioning from a power saving state to an operating state in which the destination circuitry is able to process the data item.

Figure 3C:
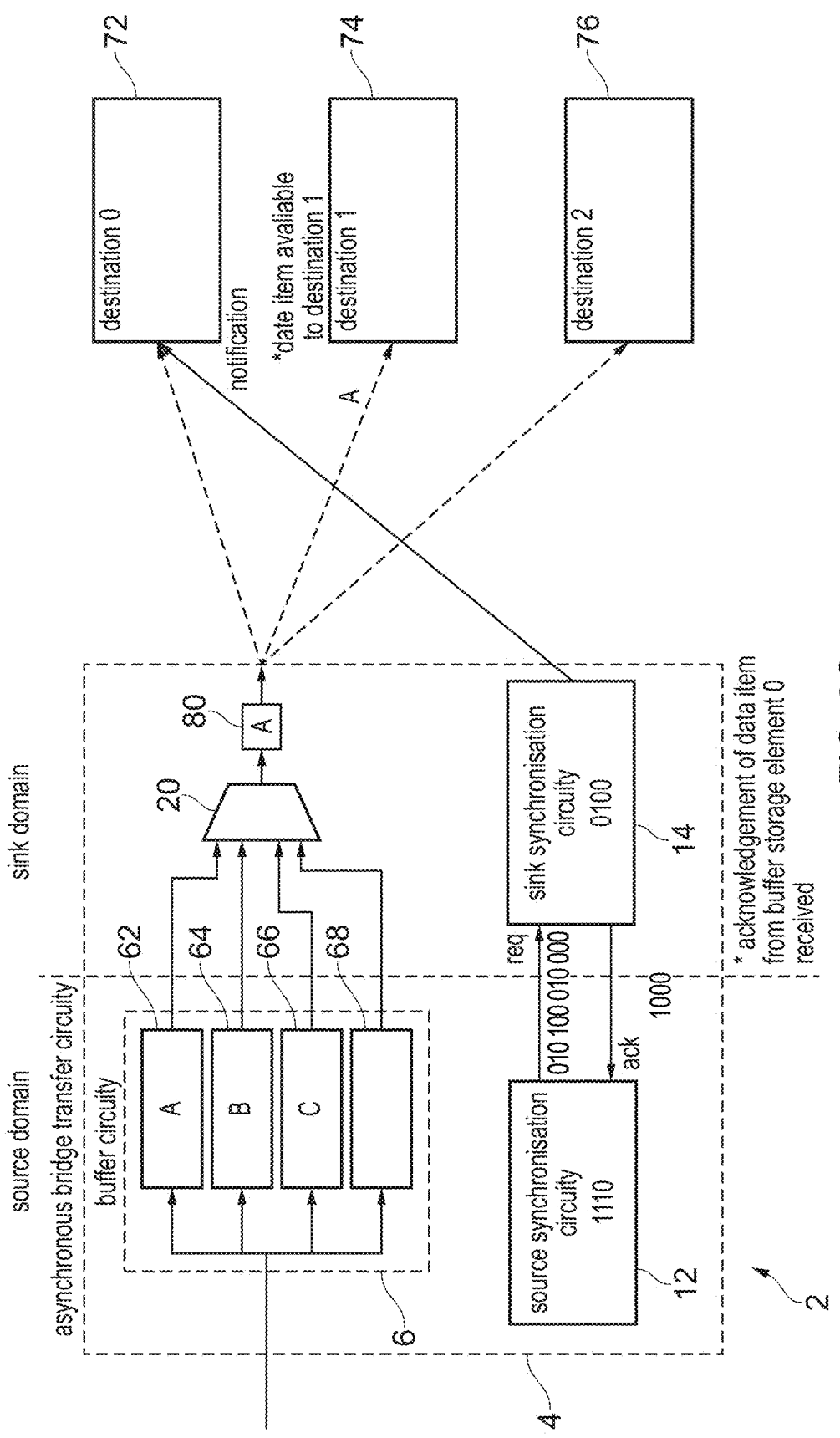

At a subsequent clock cycle, as depicted in FIG. 3C, the sink synchronisation circuitry 14 causes the data item A to be read into the sink storage element 80 where it can be accessed by destination 1 74. The sink synchronisation circuitry 14 then issues an acknowledgement signal to the source synchronisation circuitry 12 to indicate that the data item A has been read from buffer storage element 62 such that it is safe for a new data item to be stored into that buffer storage element 62. In this example, the acknowledgement signal provides one bit for each buffer storage element and is updated to confirm that the data item has been read from that element. However, other forms of acknowledgement signal may be used, such as those depicted in, and described with reference to, FIGS. 4A-4B.

A new data item, data item C has also been populated into the buffer circuitry 6, the status of source synchronisation circuitry 12 has been updated accordingly, and the transfer request signal has been updated to indicate that the new data item has been stored in buffer storage element 66 and to encode the destination of the data item as destination 1 74.

The state of the sink synchronisation circuitry 14 has also been updated to reflect the transfer request relating to the data item in buffer storage element 64 and a notification of the upcoming data item is provided to destination 0 in respect of the data item in buffer storage element 64.

Figure 3D:
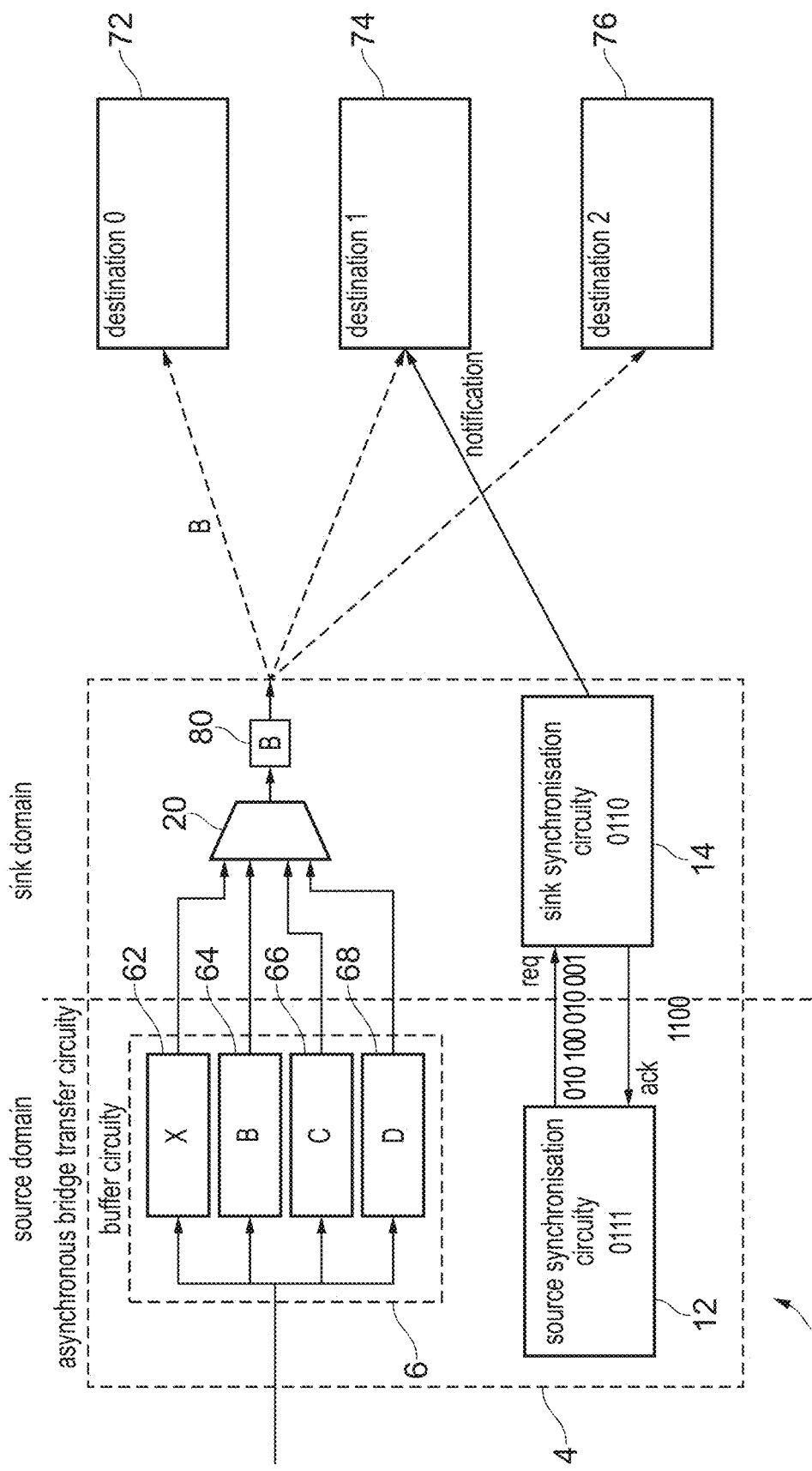

On a subsequent cycle, depicted in FIG. 3D, the contents of buffer storage element 62 are considered invalid since the source synchronisation circuitry 12 has recognised the acknowledgement signal in respect of that data item. A new data item, data item D has been received in the buffer circuitry 6 and the state of the source synchronisation circuitry 12 has been updated to 0111. This status reflects that the buffer storage element 62 does not contain valid data and can be overridden while the other buffer storage elements are populated with data items that the source synchronisation circuitry 12 has not yet been notified have been transferred into the sink domain.

The transfer request signal has also been updated to indicate that a data item has been stored in buffer storage element 68 and to encode that that data item targets destination 2. Notably, in this example, the transfer request is indicated using changes in the transfer request signal. Consequently, although the source synchronisation circuitry 12 has now been notified that data item A from buffer storage element 62 has been read into the sink domain, the portion of the transfer request signal corresponding to buffer storage element 62 is not updated at this point.

Elsewhere in the apparatus 2, an upcoming data item notification is issued to destination 1 in respect of the data item in buffer storage element 66, data item B has been read into sink storage element 80 for access by destination 0 72, the status of sink synchronisation circuitry 14 has been updated to 0110, and the acknowledgement signal now has the value 1100 to acknowledge that data items A and B have been read into the sink domain.

Figure 3E:
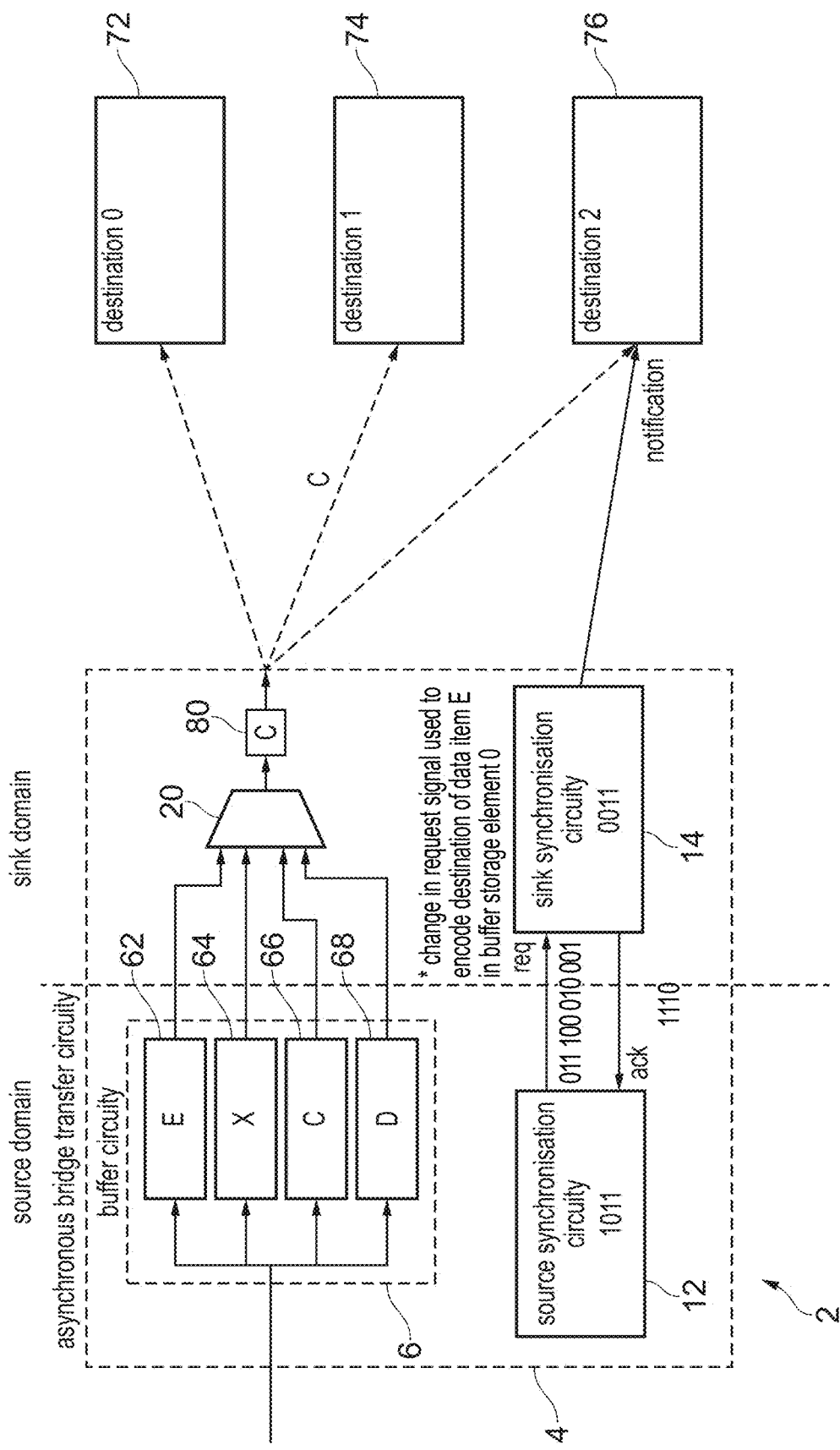

In FIG. 3E, a new data item, data item E is stored into the buffer storage element 62 and the first bit of the status maintained by the source synchronisation circuitry 12 is updated accordingly. To provide the transfer request in respect of the data item E, the transfer request signal is updated to 011,100,010,001. The previous transfer request signal (as depicted in FIG. 3D) was 010,100,010,001 and so that change to the transfer request signal comes in the bit of the transfer request signal corresponding to destination 2 within the portion corresponding to buffer storage element 62. Thus, this transfer request signal is used to indicate that the data item E, in buffer storage element 62 targets destination 2.

Elsewhere in the apparatus 2, the data item B can be considered invalid since the acknowledgement signal in respect of that data item has been received by the source synchronisation circuitry 12. Data item C is read into the sink storage register 80 to be accessed by destination 1 74, and the sink synchronisation circuitry 14 provides an upcoming data item notification to destination 2 in respect of the data item in buffer storage element 68 which will be available to the destination 2 on the next clock cycle in the sink domain.

Figure 3F:
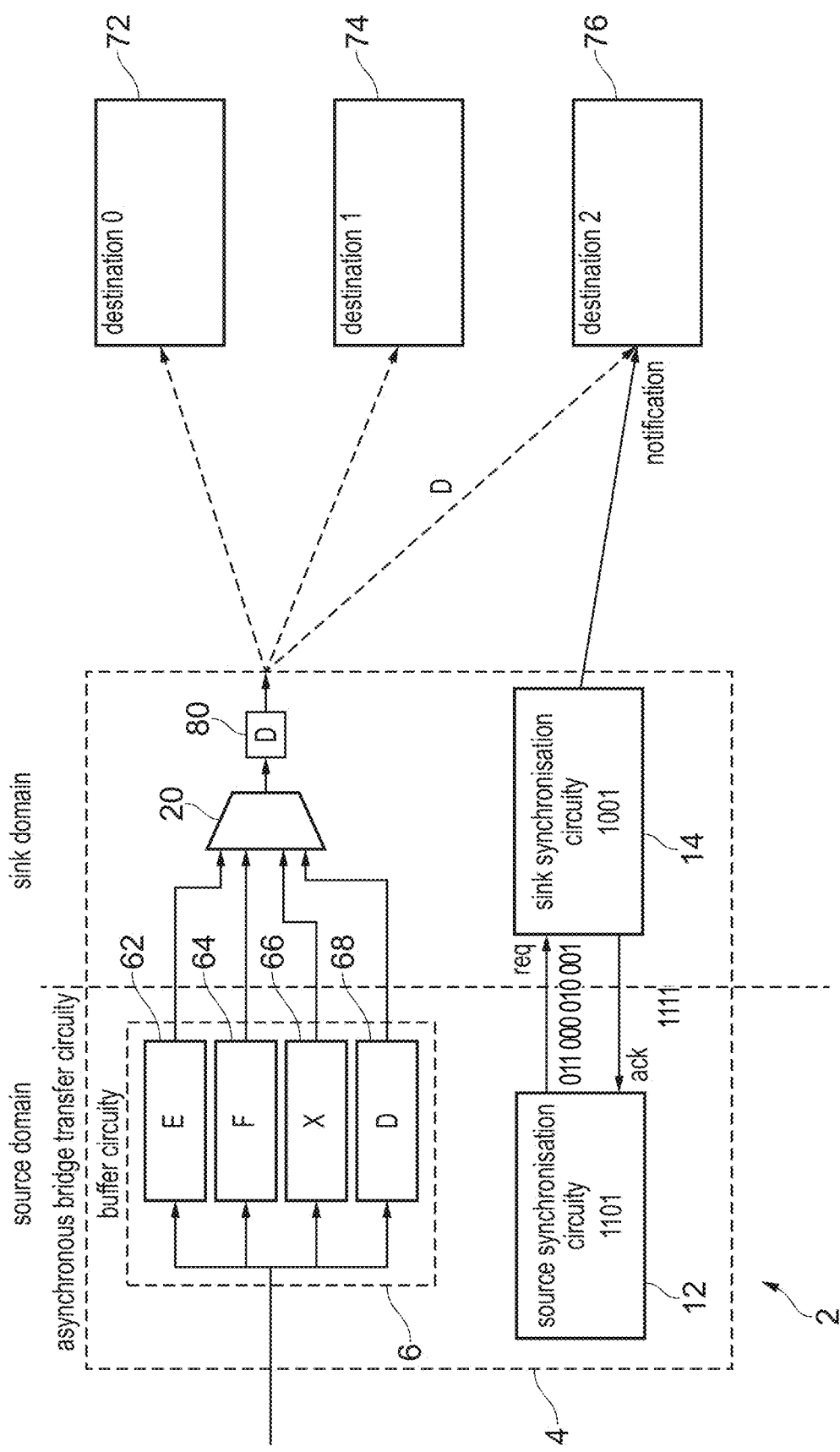

In FIG. 3F, a data item F has been populated into buffer storage element 64 and the source synchronisation circuitry 12 has updated its own state to 1101 to reflect that buffer storage elements 62, 64, and 68 are populated with data to be transferred but that buffer storage element 66 is not.

Data item F targets destination 0 72 and so to indicate the transfer request, the bit of the transfer request signal corresponding to destination 0 within the portion corresponding to buffer storage element 64 is updated. Thus, the transfer request signal is updated from 011,100,010,001 to 011,000,010,001. Notably, although the first bit position within the second portion of the transfer request signal has not been set to 0, this change indicates that a data item is present in the buffer storage element 64 and that the data item targets destination 0.

On the basis of the transfer request from the previous figure, the sink synchronisation circuitry 14 sends an upcoming data item notification to destination 2 and the data item D is also made available to destination 2 76. The sink synchronisation circuitry 14 then sends an acknowledgement signal to acknowledge receipt of the data item from data storage element 68.

Thus, the transfer request may be used to provide an early indication of the destination of upcoming data items. It will be appreciated that more or fewer destinations could be supported with the transfer request being used to encode which of these destinations an upcoming data item relates to.

Figure 4A:
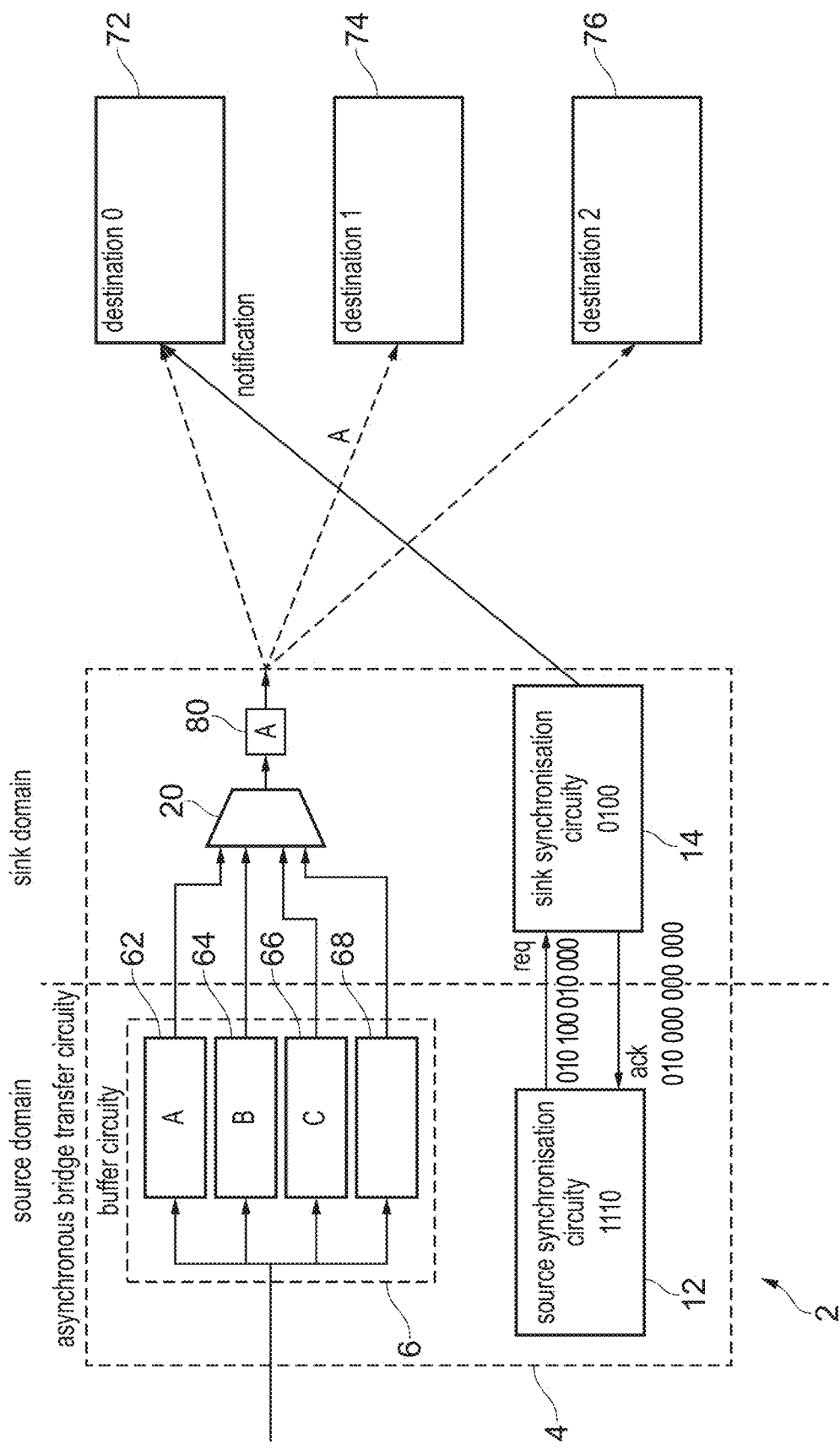
FIGS. 4A-4B show forms of acknowledgement signal that could be used according to examples.
Figure 4B:
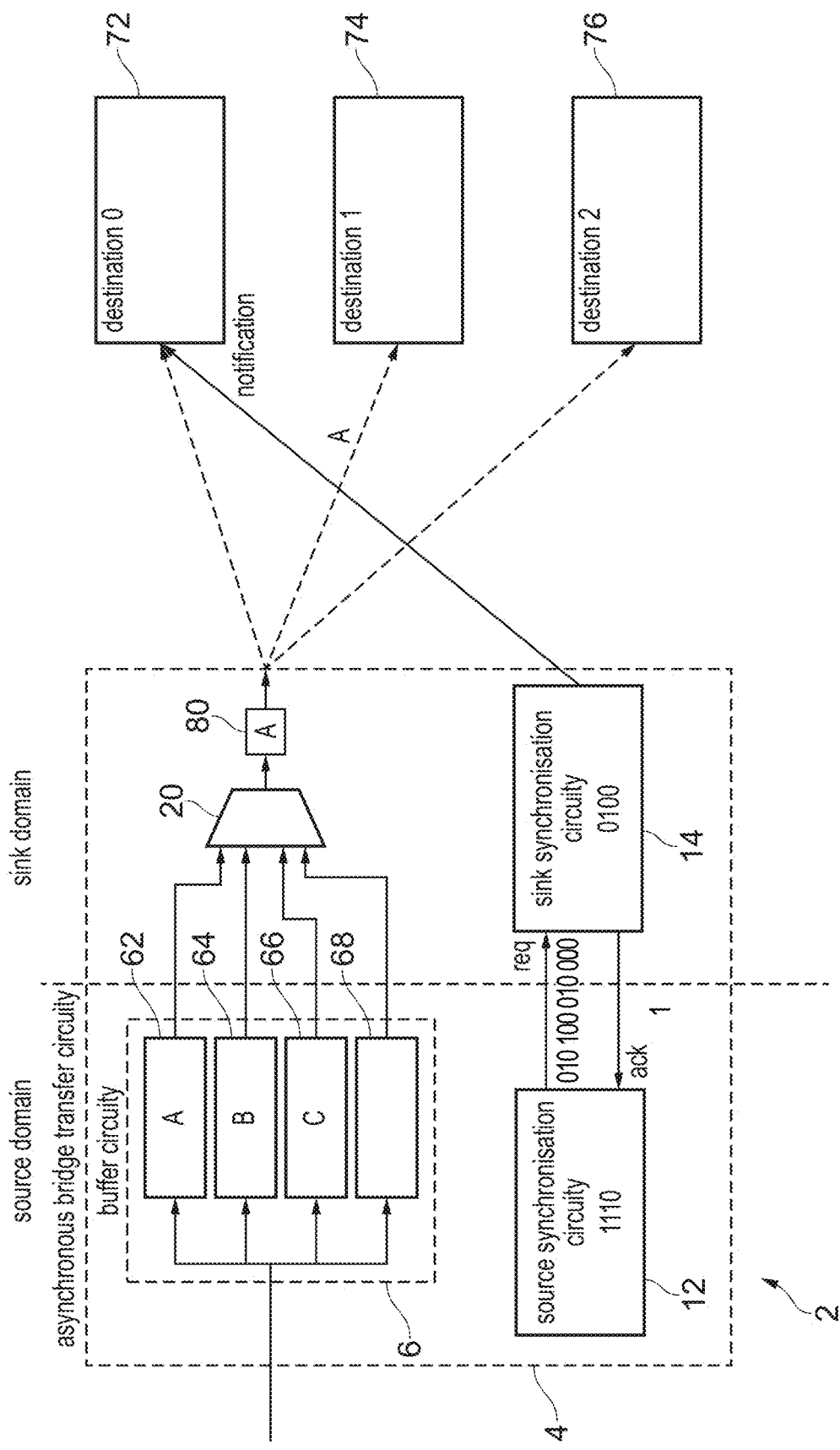

FIGS. 4A-4B show forms of acknowledgement signal that could be used according to other examples. FIGS. 4A-4B largely correspond to FIG. 3C but differ in the form of acknowledgement signal that is used by the sink synchronisation circuitry 14. In FIG. 4A, an acknowledgement signal having a similar form to the transfer request signal described herein is used. Thus, the acknowledgement signal in FIG. 4A has the value 010,000,000,000 to indicate that the data item from buffer storage element 62 that targets destination 1 74 has been received. The acknowledgement signal in this example therefore confirms both the buffer storage element 62 from which the data item has been received and the destination targeted by that data item.

In the example of FIG. 4B, a single bit acknowledgement signal is used where a change in the bit value is used to indicate that a next data item has been transferred. This form of acknowledgement signal may be used where the buffer circuitry 6 is FIFO buffer circuitry and so the order in which buffer storage elements will be accessed is fixed.

Figure 5:
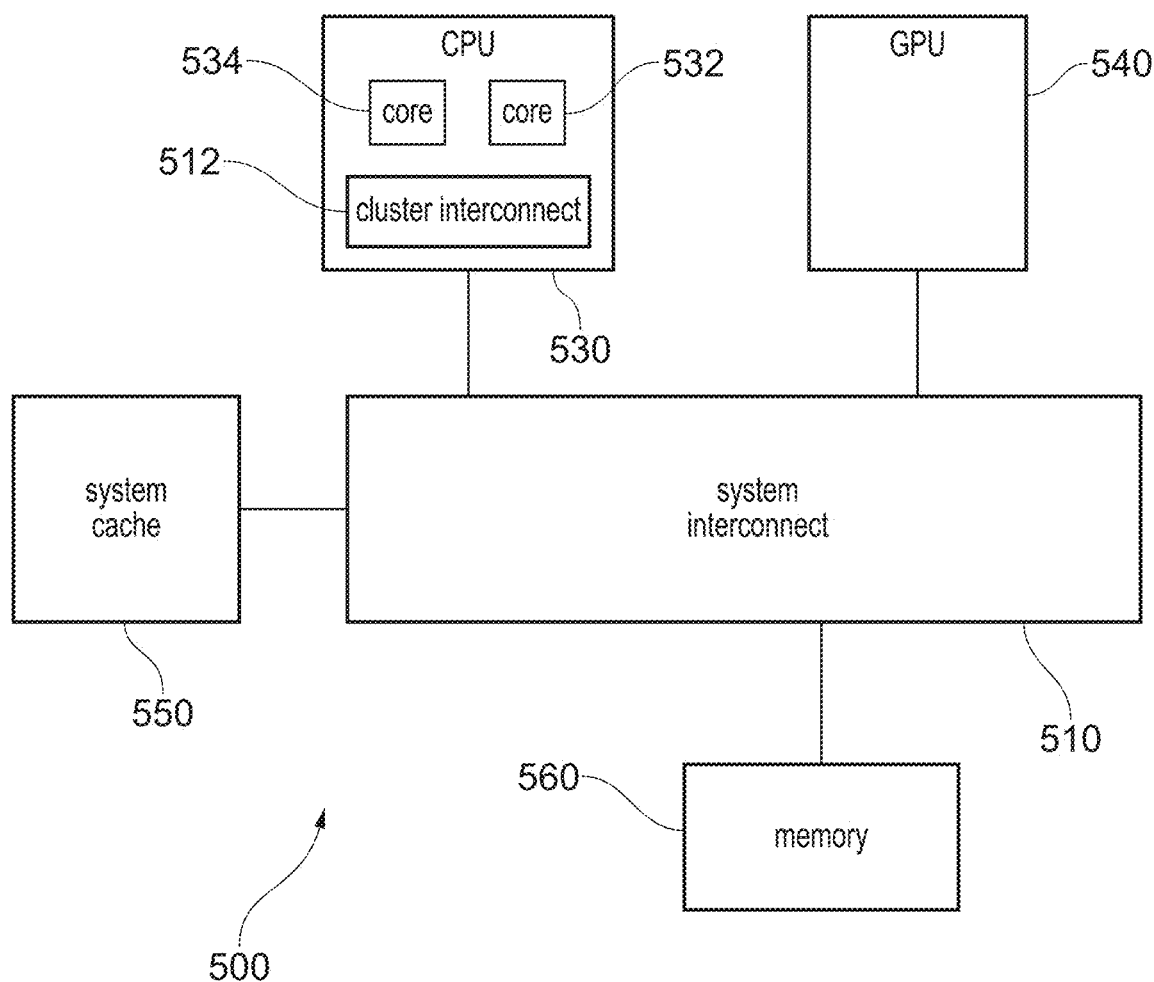
FIG. 5 shows an example system in which the asynchronous bridge transfer circuitry may be implemented.

FIG. 5 shows an example system in which the asynchronous bridge transfer circuitry 4 may be implemented. FIG. 5 schematically illustrates a data processing system 500 (e.g. an integrated circuit or system-on-chip) which includes a number of devices 530, 540,550, 560 and a system interconnect 510 to enable communication and manage coherency between devices. In this example the devices include a central processing unit (CPU) 532 comprising a number of cores 532, 534 for performing general purpose processing, a graphics processing unit (GPU) 540 for performing graphics processing, a system cache 550, and a memory 560. The cores 532, 534 within the CPU 530 are coupled to each other via a cluster interconnect 530 which is also used to couple components of the CPU 530 to the system interconnect 510.

An asynchronous bridge may be used wherever a clock domain boundary appears in the system 500. In particular, asynchronous bridges may be implemented between the cores 532, 534 and the cluster interconnect 512 and/or between the devices 530, 534, 550, 560 and the system interconnect 510.

Figure 6:
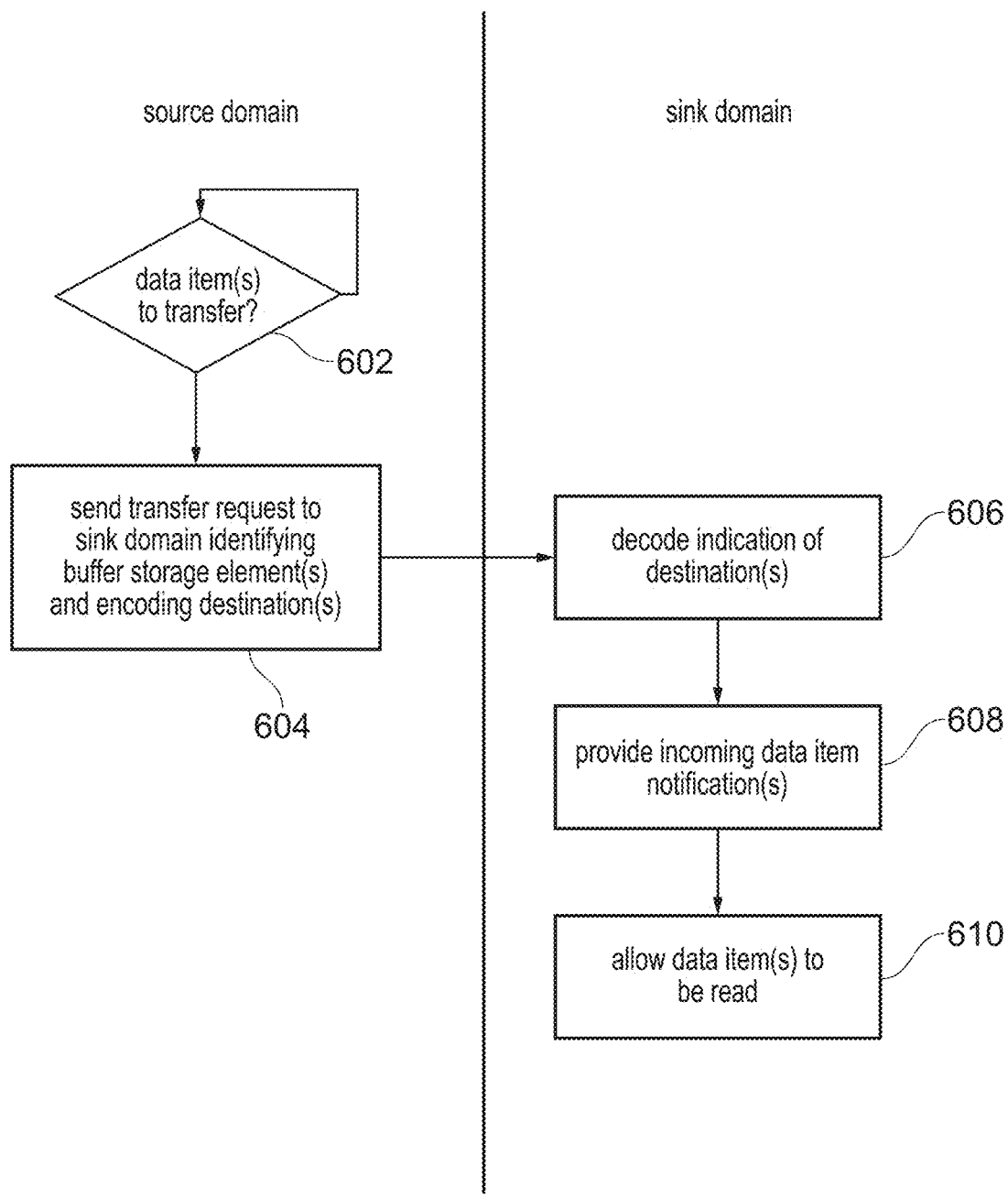
FIG. 6 is a flowchart illustrating the operations performed by the synchronisation circuitry in the source domain and the sink domain of the asynchronous bridge transfer circuitry according to an example.

FIG. 6 is a flowchart illustrating the operations performed by the synchronisation circuitry in the source domain and the sink domain of the asynchronous bridge transfer circuitry 4 according to an example. When there are one or more data items to be transferred, as determined by the source synchronisation circuitry 12 at step 602, the source synchronisation circuitry 12, at step 604, sends a transfer request to the sink domain which identifies the buffer storage element or elements into which the data item or items have been stored, and encodes the destination or destinations of those data items.

This transfer request is received in the sink domain where it is decoded by the sink synchronisation circuitry 14 to identify the destinations targeted by the data items at step 606. At step 608, the sink synchronisation circuitry 14 provides an incoming data item notification to the destination or destinations targeted by the data items to allow them to transition to an operating state, for example, if they were already in a low-power state. On a subsequent cycle, the data items can then be read by the destination circuitry.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
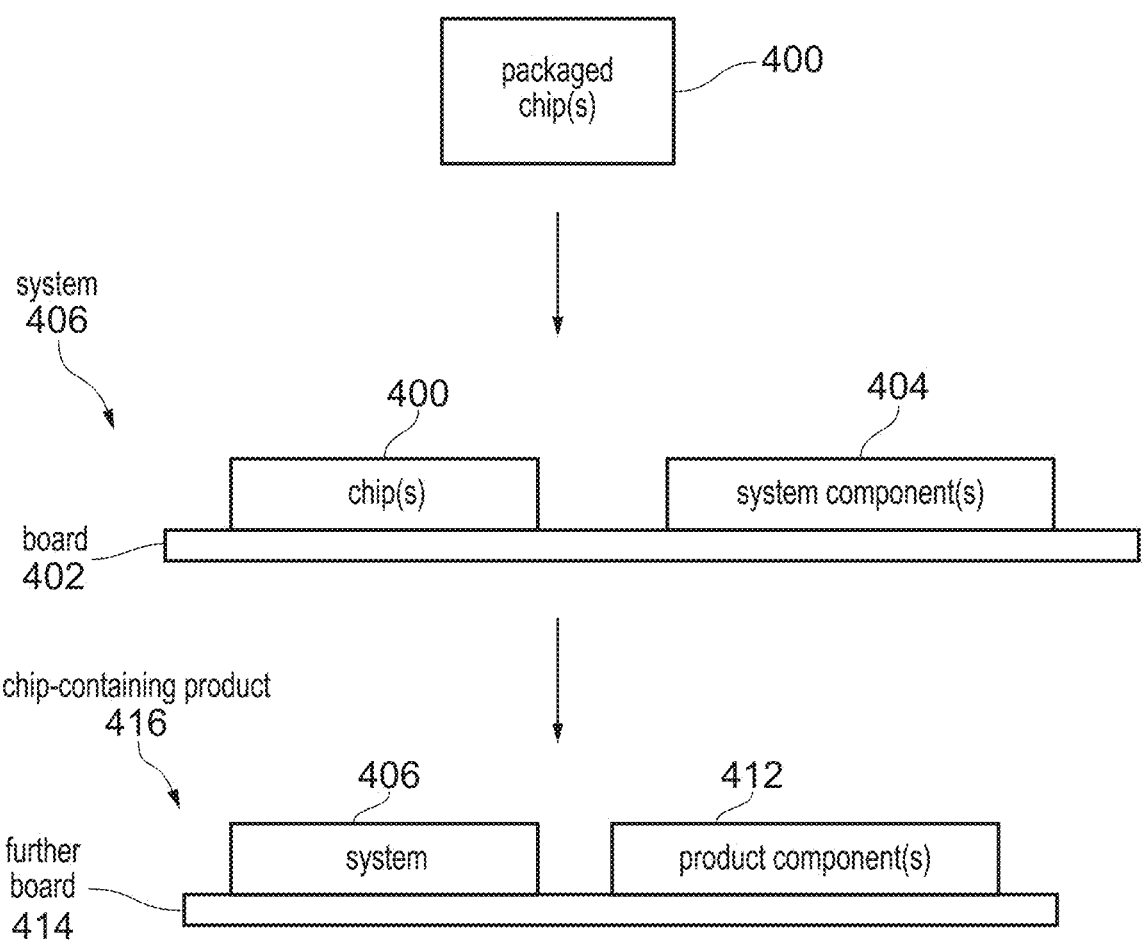
FIG. 7 illustrates a system and a chip-containing product.

As shown in FIG. 7, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts.

The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

The techniques described herein are illustrated with reference to the following examples.

Example 1. An apparatus comprising:
  asynchronous boundary transfer circuitry to transfer data from a source domain to a sink domain across a clock domain boundary, the asynchronous boundary transfer circuitry comprising:

buffer circuitry comprising one or more buffer storage elements to store data items for transfer across the clock domain boundary;

source synchronisation circuitry to control writing into the one or more buffer storage elements from the source domain; and sink synchronisation circuitry to control reading out from the one or more buffer storage elements in the sink domain;

wherein to initiate a transfer of one or more particular data items from the source domain to the sink domain, the source synchronisation circuitry is configured to send a transfer request to the sink synchronisation circuitry indicating that the one or more particular data items have been stored in one or more particular buffer storage elements of the one or more buffer storage elements, the transfer request additionally encoding an indication of one or more respective elements of destination circuitry targeted by the one or more particular data items;

wherein the sink synchronisation circuitry is responsive to a given transfer request to:
  decode, from the given transfer request, an indication of one or more given elements of destination circuitry targeted by one or more given data items associated with the given transfer request,
  provide one or more incoming data item notifications to the one or more given elements of destination circuitry, and
  allow the one or more given data items to be read from one or more given buffer storage elements indicated by the given transfer request.

Example 2. The apparatus according to example 1, wherein the transfer request comprises respective portions corresponding to each of the one or more buffer storage elements.

Example 3. The apparatus according to example 2, wherein each portion of the transfer request comprises respective elements corresponding to each of a plurality of supported destination indications.

Example 4. The apparatus according to example 3, wherein to indicate that the one or more particular data items have been stored in the particular buffer storage element and to encode the indication of the respective elements of particular destination circuitry, the source synchronisation circuitry is configured to set, for each of the one or more particular data items, an element of the transfer request corresponding to a respective element of destination circuitry within a portion of the transfer request corresponding to the respective buffer storage element.

Example 5. The apparatus according to any preceding example, wherein the sink synchronisation circuitry is configured to provide the one or more incoming data item notifications at least one clock cycle in the sink domain before allowing the one or more given data items to be read from the one or more given buffer storage elements.

Example 6. The apparatus according to any preceding example, wherein the source synchronisation circuitry is configured to communicate the transfer request by sending a transfer request signal, the transfer request signal generated by changing one or more elements of a previous transfer request signal, the one or more elements selected to be changed indicative of the one or more particular buffer storage elements and the respective elements of destination circuitry.

Example 7. The apparatus according to any preceding example, wherein the sink synchronisation circuitry is responsive to the given transfer request to send an acknowledgement signal to the source synchronisation circuitry.

Example 8. The apparatus according to example 7, wherein the acknowledgement signal comprises a single bit to indicate that the given transfer request has been received.

Example 9. The apparatus according to example 7, wherein the sink synchronisation circuitry is configured to send, as the acknowledgement signal, the given transfer request back to the source synchronisation circuitry.

Example 10. The apparatus according to example 7, wherein the acknowledgement signal comprises an element for each of the one or more buffer storage elements and source synchronisation circuitry is configured to set one or more elements of the acknowledgement signal to indicate the buffer storage elements for which the given transfer request has been accepted.

Example 11. The apparatus according to any preceding example, the apparatus further comprising:
  processing circuitry in the sink domain, the processing circuitry operable as destination circuitry;
  wherein the processing circuitry is responsive to an incoming data item notification from the sink synchronisation circuitry when the processing circuitry is operating in a power saving state to transition the processing circuitry to an operating state.

Example 12. The apparatus according to example 11, wherein:
  the processing circuitry comprises clock control circuitry configured to control a clock signal provided within the processing circuitry;
  the clock control circuitry is operable to gate the clock signal in the power saving state; and
  to transition the processing circuitry to the operating state, the clock control circuitry is configured to cease gating the clock signal.

Example 13. The apparatus according to any preceding example, wherein the buffer circuitry is first-in, first-out (FIFO) buffer circuitry.

Example 14. A system comprising:
  the apparatus of any preceding example, implemented in at least one packaged chip;
  at least one system component; and
  a board,
  wherein the at least one packaged chip and the at least one system component are assembled on the board.

Example 15. A chip-containing product comprising the system of example 14 assembled on a further board with at least one other product component.

Example 16. A non-transitory computer-readable medium to store computer-readable code for fabrication of an apparatus comprising:
  asynchronous boundary transfer circuitry to transfer data from a source domain to a sink domain across a clock domain boundary, the asynchronous boundary transfer circuitry comprising:
    buffer circuitry comprising one or more buffer storage elements to store data items for transfer across the clock domain boundary;
    source synchronisation circuitry to control writing into the one or more buffer storage elements from the source domain and sink synchronisation circuitry to control reading out from the one or more buffer storage elements in the sink domain;
  wherein to initiate a transfer of one or more particular data items from the source domain to the sink domain, the source synchronisation circuitry is configured to send a transfer request to the sink synchronisation circuitry indicating that the one or more particular data items have been stored in one or more particular buffer storage elements of the one or more buffer storage elements, the transfer request additionally encoding an indication of respective elements of destination circuitry targeted by the one or more particular data items;

wherein the sink synchronisation circuitry is responsive to a given transfer request to:

decode, from the given transfer request, an indication of one or more given elements of destination circuitry targeted by one or more given data items associated with the given transfer request, provide one or more incoming data item notifications to the one or more given elements of destination circuitry, and allow the one or move given data items to be read from one or more given buffer storage elements indicated by the given transfer request.

Example 17. A method of transferring data from a source domain to a sink domain across a clock domain boundary, the method comprising:

storing data items for transfer across the clock domain boundary;

to initiate a transfer of one or more particular data items from the source domain to the sink domain, sending a transfer request to the sink synchronisation circuitry indicating that the one or more particular data items have been stored in one or more particular buffer storage elements of the one or more buffer storage elements, the transfer request additionally encoding an indication of one or more respective elements of destination circuitry targeted by the one or more particular data items;

responsive to a given transfer request:

decoding, from the given transfer request, an indication of one or more given elements of destination circuitry targeted by one or more given data items associated with the given transfer request, providing one or more incoming data item notifications to the one or more given elements of destination circuitry, and allowing the one or move given data items to be read from one or more given buffer storage elements indicated by the given transfer request.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

asynchronous boundary transfer circuitry to transfer data from a source domain to a sink domain across a clock domain boundary, the asynchronous boundary transfer circuitry comprising:

buffer circuitry comprising one or more buffer storage elements to store data items for transfer across the clock domain boundary;

source synchronisation circuitry to control writing into the one or more buffer storage elements from the source domain; and sink synchronisation circuitry to control reading out from the one or more buffer storage elements in the sink domain;

wherein to initiate a transfer of one or more particular data items from the source domain to the sink domain, the source synchronisation circuitry is configured to send a transfer request to the sink synchronisation circuitry indicating that the one or more particular data items have been stored in one or more particular buffer storage elements of the one or more buffer storage elements, the transfer request additionally encoding an indication of one or more respective elements of destination circuitry targeted by the one or more particular data items;

wherein the sink synchronisation circuitry is responsive to a given transfer request to:

decode, from the given transfer request, an indication of one or more given elements of destination circuitry targeted by one or more given data items associated with the given transfer request, provide one or more incoming data item notifications to the one or more given elements of destination circuitry, and allow the one or more given data items to be read from one or more given buffer storage elements indicated by the given transfer request.

2. The apparatus according to claim 1, wherein the transfer request comprises respective portions corresponding to each of the one or more buffer storage elements.

3. The apparatus according to claim 2, wherein each portion of the transfer request comprises respective elements corresponding to each of a plurality of supported destination indications.

4. The apparatus according to claim 3, wherein to indicate that the one or more particular data items have been stored in the particular buffer storage element and to encode the indication of the respective elements of particular destination circuitry, the source synchronisation circuitry is configured to set, for each of the one or more particular data items, an element of the transfer request corresponding to a respective element of destination circuitry within a portion of the transfer request corresponding to the respective buffer storage element.

5. The apparatus according to any claim 1, wherein the sink synchronisation circuitry is configured to provide the one or more incoming data item notifications at least one clock cycle in the sink domain before allowing the one or more given data items to be read from the one or more given buffer storage elements.

6. The apparatus according to claim 1, wherein the source synchronisation circuitry is configured to communicate the transfer request by sending a transfer request signal, the transfer request signal generated by changing one or more elements of a previous transfer request signal, the one or more elements selected to be changed indicative of the one or more particular buffer storage elements and the respective elements of destination circuitry.

7. The apparatus according to claim 1, wherein the sink synchronisation circuitry is responsive to the given transfer request to send an acknowledgement signal to the source synchronisation circuitry.

8. The apparatus according to claim 7, wherein the acknowledgement signal comprises a single bit to indicate that the given transfer request has been received.

9. The apparatus according to claim 7, wherein the sink synchronisation circuitry is configured to send, as the acknowledgement signal, the given transfer request back to the source synchronisation circuitry.

10. The apparatus according to claim 7, wherein the acknowledgement signal comprises an element for each of the one or more buffer storage elements and source synchronisation circuitry is configured to set one or more elements of the acknowledgement signal to indicate the buffer storage elements for which the given transfer request has been accepted.

11. The apparatus according to claim 1, the apparatus further comprising:
processing circuitry in the sink domain, the processing circuitry operable as destination circuitry;
wherein the processing circuitry is responsive to an incoming data item notification from the sink synchronisation circuitry when the processing circuitry is operating in a power saving state to transition the processing circuitry to an operating state.

12. The apparatus according to claim 11, wherein:
the processing circuitry comprises clock control circuitry configured to control a clock signal provided within the processing circuitry;
the clock control circuitry is operable to gate the clock signal in the power saving state; and
to transition the processing circuitry to the operating state, the clock control circuitry is configured to cease gating the clock signal.

13. The apparatus according to claim 1, wherein the buffer circuitry is first-in, first-out (FIFO) buffer circuitry.

14. A system comprising:
the apparatus of claim 1, implemented in at least one packaged chip;
at least one system component; and
a board,
wherein the at least one packaged chip and the at least one system component are assembled on the board.

15. A chip-containing product comprising the system of claim 14 assembled on a further board with at least one other product component.

16. A non-transitory computer-readable medium to store computer-readable code for fabrication of the apparatus of claim 1.

17. A method of transferring data from a source domain to a sink domain across a clock domain boundary, the method comprising:
storing data items for transfer across the clock domain boundary;
to initiate a transfer of one or more particular data items from the source domain to the sink domain, sending a transfer request to the sink synchronisation circuitry indicating that the one or more particular data items have been stored in one or more particular buffer storage elements of the one or more buffer storage elements, the transfer request additionally encoding an indication of one or more respective elements of destination circuitry targeted by the one or more particular data items;
responsive to a given transfer request:
decoding, from the given transfer request, an indication of one or more given elements of destination circuitry targeted by one or more given data items associated with the given transfer request,
providing one or more incoming data item notifications to the one or more given elements of destination circuitry, and
allowing the one or move given data items to be read from one or more given buffer storage elements indicated by the given transfer request.

* * * * *